(12) United States Patent
Misra et al.

(10) Patent No.: US 8,969,263 B2
(45) Date of Patent: Mar. 3, 2015

(54) TREATMENT FLUID CONTAINING A CORROSION INHIBITOR OF A POLYMER INCLUDING A SILICONE AND AMINE GROUP

(71) Applicant: Halliburton Energy Services, Inc, Houston, TX (US)

(72) Inventors: Garima Misra, Pune (IN); Arunesh Kumar, Feltham (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/624,301

(22) Filed: Sep. 21, 2012

(65) Prior Publication Data

US 2014/0087975 A1    Mar. 27, 2014

(51) Int. Cl.
*C09K 8/60* (2006.01)
*C09K 8/22* (2006.01)
*C09K 8/06* (2006.01)

(52) U.S. Cl.
USPC ........... 507/233; 507/127; 507/136; 507/261; 507/939

(58) Field of Classification Search
CPC .................. C09K 2208/32; Y10S 507/939
USPC ........................ 507/127, 233, 136, 261, 939
See application file for complete search history.

(56) References Cited

U.S. PATENT DOCUMENTS

| | | | |
|---|---|---|---|
| 3,816,184 A * | 6/1974 | Redmore et al. ............. | 148/250 |
| 5,591,381 A | 1/1997 | Walker | |
| 5,653,695 A | 8/1997 | Hopkins et al. | |
| 5,756,004 A | 5/1998 | Brezinski | |
| 5,792,420 A | 8/1998 | Brezinski | |
| 5,909,774 A | 6/1999 | Griffith et al. | |
| 5,916,484 A | 6/1999 | Brezinski | |
| 6,056,896 A | 5/2000 | Brezinski | |
| 6,180,057 B1 | 1/2001 | Taylor et al. | |
| 6,192,987 B1 | 2/2001 | Funkhouser et al. | |
| 6,315,045 B1 | 11/2001 | Brezinski | |
| 6,525,011 B2 | 2/2003 | Brezinski | |
| 6,593,274 B2 | 7/2003 | Policello | |
| 6,877,563 B2 * | 4/2005 | Todd et al. .................... | 166/312 |
| 7,216,710 B2 | 5/2007 | Welton et al. | |
| 7,498,293 B2 | 3/2009 | Piccinelli et al. | |
| 8,062,586 B2 | 11/2011 | Cassidy et al. | |
| 2006/0247143 A1 | 11/2006 | Gallagher et al. | |
| 2007/0041930 A1 | 2/2007 | Meder et al. | |
| 2009/0156432 A1 | 6/2009 | Cassidy et al. | |
| 2009/0221455 A1 | 9/2009 | Ke et al. | |
| 2010/0087340 A1 | 4/2010 | Cassidy et al. | |
| 2011/0100630 A1 | 5/2011 | Evans et al. | |
| 2011/0190173 A1 | 8/2011 | Cassidy et al. | |
| 2011/0224111 A1 | 9/2011 | Gupta et al. | |

OTHER PUBLICATIONS

O'Lenick, Jr. et al, Amino Silicone Polymers as Hair Softeners and Conditioners, Cosmetics & Toiletries magazine, vol. 113 May 1998.
Rahim, et al, Naturally Occurring Organic Substances as Corrosion Inhibitors for Mild Steel in Acid Medium, Mat.-wiss. u. Werkstofftech. 28, 98-102 (1997).
Material Safety Data Sheet, LK-HS 9500B, Elkay Chemicals PVT. LTD. Bhosari, Pune 26., Form No. RND/FM/07, Rev 00/Jun. 11.
Product Data Sheet, HII-124B, Corrosion Inhibitor Intensifier, Halliburton Energy Services, Inc., Dec. 2007, USA.
Product Data Sheet, HII-124C, Inhibitor Intensifier, Halliburton Energy Services, Inc., Jan. 2008, USA.
Product Data Sheet, BARABUF, Halliburton Energy Services, Inc., Sep. 3, 2010, USA.
Product Data Sheet, BARAZAN D Plus, Halliburton Energy Services, Inc., May 16, 2012, USA.
Product Data Sheet, RHEMOD L, Halliburton Energy Services, Inc., Aug. 31, 2010, USA.
Product Data Sheet, TAU-MOD, Halliburton Energy Services, Inc., Sep. 3, 2010, USA.
Product Data Sheet, RM-63, Halliburton Energy Services, Inc., Mar. 26, 2010, USA.
Product Data Sheet, EZ MUL NT, Halliburton Energy Services, Inc., Mar. 26, 2010, USA.
Product Data Sheet, INVERMUL NT, Halliburton Energy Services, Inc., Mar. 26, 2010, USA.
Product Data Sheet, LE SUPERMUL, Halliburton Energy Services, Inc., Mar. 26, 2010, USA.
Product Data Sheet, BARACARB, Halliburton Energy Services, Inc., Mar. 24, 2010.
Product Data Sheet, BARODENSE, Halliburton Energy Services, Inc., Mar. 25, 2010, USA.
Product Data Sheet, BAROID, Halliburton Energy Services, Inc., Mar. 25, 2010, USA.
Product Data Sheet, N-DRIL HT PLUS, Halliburton Energy Services, Inc., Mar. 26, 2010, USA.
Product Data Sheet, ADAPTA, Halliburton Energy Services, Inc., Mar. 2, 2010, USA.
Product Data Sheet, TORQ-TRIM II, Halliburton Energy Services, Inc., Mar. 26, 2010, USA.

* cited by examiner

*Primary Examiner* — Aiqun Li
(74) *Attorney, Agent, or Firm* — Holly Soehnge; Sheri Higgins Law; Sheri Higgins

(57) ABSTRACT

A treatment fluid comprises: water; a carboxylate; and a corrosion inhibitor, wherein the corrosion inhibitor is a polymer, wherein the polymer comprises silicone, an ether monomer residue, and an amine functional group; wherein a test fluid consisting essentially of the water, the carboxylate, and the corrosion inhibitor, and in the same proportions as in the treatment fluid, is capable of providing a corrosion weight loss to a metal plate of less than 0.05 pounds per square feet ($lb/ft^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 $lb/ft^2$ under the testing conditions. A method of treating a portion of a well comprises: forming the treatment fluid; and introducing the treatment fluid into the well.

24 Claims, 1 Drawing Sheet

TREATMENT FLUID CONTAINING A CORROSION INHIBITOR OF A POLYMER INCLUDING A SILICONE AND AMINE GROUP

TECHNICAL FIELD

A treatment fluid and methods of use are provided. The treatment fluids include a corrosion inhibitor of a polymer comprising silicone and at least one amine group. The treatment fluids can be used in conjunction with a delayed acid breaker fluid containing a carboxylate. The carboxylate can form a carboxylic acid in the presence of water via hydrolysis; and can be used to remove a wellbore filtercake. The carboxylic acid can react with the amine functional group of the corrosion inhibitor to form an ammonium salt. The ammonium salt can then protect metal components from corrosion due to the carboxylic acid.

SUMMARY

According to an embodiment, a method of treating a portion of a well comprises: forming a treatment fluid, wherein the treatment fluid comprises: (A) water; (B) a carboxylate; and (C) a corrosion inhibitor, wherein the corrosion inhibitor is a polymer, wherein the polymer comprises silicone, an ether monomer residue, and an amine functional group; wherein a test fluid consisting essentially of the water, the carboxylate, and the corrosion inhibitor, and in the same proportions as in the treatment fluid, is capable of providing a corrosion weight loss to a metal plate of less than 0.05 pounds per square feet (lb/ft$^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 lb/ft$^2$ under the testing conditions; and introducing the treatment fluid into the well.

According to another embodiment, a method of treating a portion of a well comprises: forming a treatment fluid, wherein the treatment fluid comprises: (A) water; (B) a carboxylate, wherein the carboxylate is capable of forming a carboxylic acid in the presence of the water; and (C) a corrosion inhibitor, wherein the corrosion inhibitor: (i) is a polymer, wherein the polymer comprises silicone, an ether monomer residue, and an amine functional group; and (ii) is capable of forming an ammonium salt in the presence of the carboxylic acid; and introducing the treatment fluid into the well.

According to another embodiment, a treatment fluid comprises: water; a carboxylate; and a corrosion inhibitor, wherein the corrosion inhibitor is a polymer, wherein the polymer comprises silicone, an ether monomer residue, and an amine functional group; wherein a test fluid consisting essentially of the water, the carboxylate, and the corrosion inhibitor, and in the same proportions as in the treatment fluid, is capable of providing a corrosion weight loss to a metal plate of less than 0.05 pounds per square feet (lb/ft$^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 lb/ft$^2$ under the testing conditions.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
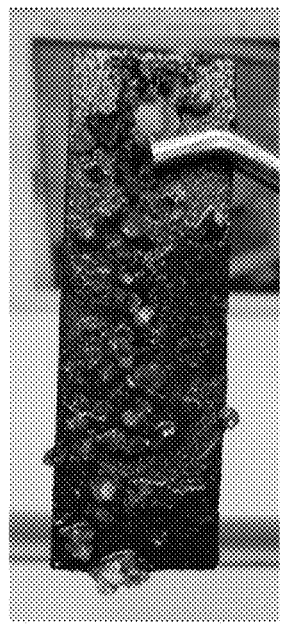
FIG. 1 is a photograph of a metal plate tested for corrosion weight loss and corrosion rate when contacted with a blank test fluid at a temperature of 200° F. (93.3° C.) for a time of 7 days.

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, the test fluid consists essentially of: the water; the carboxylate; and the corrosion inhibitor, and in the same proportions as in the treatment fluid. The test fluid can contain other ingredients so long as the presence of the other ingredients do not materially affect the basic and novel characteristics of the claimed invention, i.e., so long as the corrosion inhibitor is capable of providing corrosion weight loss of less than 0.05 pounds per square feet (lb/ft$^2$) under testing conditions of 200° F. (93.3° C.), a pressure of 500 psi (3.4 MPa), and a time of 24 hours.

It should also be understood that, as used herein, "first," "second," and "third," are arbitrarily assigned and are merely intended to differentiate between two or more monomers, etc., as the case may be, and does not indicate any sequence. Furthermore, it is to be understood that the mere use of the word "first" does not require that there be any "second," and the mere use of the word "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Many components of a well system are made from metals or metal alloys. These components are susceptible to corrosion. Corrosion is the wearing away of metals due to a chemical reaction. Corrosion can occur in a variety of ways, for example, when the metal is exposed to oxygen in the surrounding environment or when the metal is in contact with a fluid having a low enough pH, for example a pH in the acidic range. Corrosion of metal well components can be quite detrimental to oil or gas operations.

During wellbore operations, it is common to introduce a treatment fluid into the well. Examples of common treatment fluids include, but are not limited to, drilling fluids, spacer fluids, completion fluids, and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

It is common to deposit a filtercake in a portion of a well. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes water, a gelling agent, calcium carbonate, and polymers, is introduced into the open-hole wellbore. The fluid flows into a desired portion of the well. The ingredients in the fluid form the filtercake during subsequent completion operations. The filtercake can be used to bind fines, such as sand, together, can also reduce damage to formation permeability, and can also stabilize the wellbore.

It is often desirable to remove at least a portion of a filtercake at some stage in the production process. The filtercake is often removed in order to restore fluid flow between the wellbore and the subterranean formation. One common technique for removing a filtercake is to perform an acid wash. In an acid wash, a wash pipe is inserted into the wellbore. An aqueous solution of an acid or an acid precursor is then flowed through the wash pipe under pressure and the acid comes in contact with the filtercake. The acid can chemically react with some of the ingredients in the filtercake, causing those ingredients to solubilize, and thus causing the filtercake to be removed from the well. The acid wash can also be used to penetrate into the subterranean formation in order to increase the permeability of the formation.

It may be desirable to use a delayed acid breaker system in an acid wash operation. The delayed acid breaker system can be used to allow the treatment fluid to be introduced into the desired portion of the well for filtercake removal. A delayed acid breaker system can include the introduction of an acid precursor into the well. As used herein, an "acid precursor" is an anion (e.g., a salt or an ester) that forms an acid in the presence of water. Generally, release of the acid from the precursor is slow; depending upon temperature. It is common for it to take up to two days for all the acid to be released. This slow release of the acid allows the treatment fluid to be introduced into the desired portion of the well to be treated.

However, it is not uncommon for an acid to cause corrosion to metal well components, due to the low pH of the fluid. Therefore, it is common to include a corrosion inhibitor in treatment fluids that either have or may have a pH low enough to cause corrosion. Organic inhibitors can work by adsorbing themselves on the metallic surface, protecting the metallic surface by forming a film. Inhibitors can be distributed from a solution or dispersion. Some are included in a protective coating formulation. For example, a corrosion inhibitor can be added to an acid wash and can function by adsorbing on a metal surface to form a protective film. The protective film decreases the destructive reaction of the acid with the metal. Generally, a corrosion inhibitor does not completely stop the corrosion reaction, but it can eliminate more than 99% of the metal losses that would occur if the inhibitor were not present. It is preferred that the inhibitor has little or no effect on the reaction rate of the acid with limestone, dolomite or acid-soluble minerals in the filtercake.

A variety of corrosion inhibitors and formulations, which can be added to aqueous corrosive fluids, have been developed and used in the Oil and Gas industry. While such inhibitors and formulations have achieved varying degrees of success in preventing corrosion of metal surfaces, there is a continuing need for improved corrosion inhibitors that are effective in protecting the metal from corrosion when combined with the aqueous fluids of the type described above. There is also a need for environmentally-friendly corrosion inhibitors.

As used herein the "corrosion weight loss" (CWL) of a material is tested according to the following procedure. A test fluid is mixed by first adding a specified concentration of a water-soluble salt and a specified volume of deionized water to a mixing container. The container is placed on a mixer base. The motor of the base is then turned on and maintained at approximately 2,000 revolutions per minute (rpm) for approximately 60 seconds (s) (+/−1 s) until all the salt is in solution. The container is then removed from the mixer base, and a specified concentration of a carboxylate is added to a desired volume of the salt-water solution. The container is then placed on a magnetic stirrer plate and the fluid is stirred with a magnetic stirring rod for approximately 5 min. A specified concentration of the corrosion inhibitor is then added to the fluid and stirred on the magnetic stirring plate for approximately 5 min. It is to be understood that the test fluid is mixed at ambient temperature and pressure (about 71° F. (22° C.) and about 1 atm (0.1 MPa)). It is to be understood that the temperature and pressure of the test fluid is ramped up to the specified temperature and pressure after being mixed at ambient temperature and pressure. For example, the test fluid can be mixed at 71° F. (22° C.) and 1 atm (0.1 MPa) and then placed into the testing apparatus and the temperature of the treatment fluid can be ramped up to the specified temperature.

The purpose of the specific rate of temperature ramping during measurement is to simulate the temperature profile experienced by the test fluid as it is being pumped downhole. After the test fluid is ramped up to the specified temperature and specified pressure, the treatment fluid is maintained at that temperature and pressure for the duration of the testing. At least one clean and dry metal plate is weighed to at least the nearest 1/10 of a milligram (mg) to determine the first weight. The metal is selected based on the particular metal of interest. The metal can also be a metal alloy. The at least one metal plate is then threaded onto a Teflon® rod. The metal plate(s) and rod are placed into the container such that the metal plate has no contact with the inside of the container. The required volume of test fluid is poured into the container gently, down the side of the container so no air bubbles are trapped around the plate assembly. The required volume of fluid to plate surface area ratio is 20 milliliters/inches$^2$ (mL/in$^2$). The container is inserted into a high-pressure, high-temperature (HPHT) cell and a Teflon® lid is placed over the container. The cell is pressurized to the specified pressure with nitrogen gas. The aging cell is placed into an oven, pre-heated to the specified temperature for the specified time. The aging cell is allowed to cool for at least one hour. The cell is de-pressurized. The metal plate(s) is removed from the container and test fluid. The plate(s) is disassembled from the rod and corrosion products are removed. The plate(s) are washed with 15% hydrochloric acid, followed by water and then acetone, dried, and weighed to the nearest 1/10 of a mg to determine the second weight. The corrosion weight loss is calculated for each plate using the following equation and is reported in units of pounds per square feet (lb/ft$^2$). A corrosion weight loss of less than 0.05 lb/ft$^2$ can be considered acceptable.

$$CWL = \frac{\text{(weight loss)}(0.3175)}{\text{surface area}}$$

where weight loss=initial weight minus final weight in grams; and surface area=the total surface area of the metal plate exposed to acid in square inches (in$^2$). The corrosion rate (CR) for each plate can also be calculated as follows, expressed in units of mils per year lost (mpy), wherein "mils" is defined as 1/1,000 of an inch:

$$CR = \frac{WL * 22{,}300}{A * d * t}$$

where: WL=weight loss in grams; A=surface area of plate in inches$^2$; d=density of the plate in grams per square centimeters (g/cm$^2$); and t=time of exposure of the plate to a corrosive environment in days.

According to an embodiment, a method of treating a portion of a well comprises: forming a treatment fluid, wherein the treatment fluid comprises: (A) water; (B) a carboxylate; and (C) a corrosion inhibitor, wherein the corrosion inhibitor is a polymer, wherein the polymer comprises silicone, an ether monomer residue, and an amine functional group; wherein a test fluid consisting essentially of the water, the carboxylate, and the corrosion inhibitor, and in the same proportions as in the treatment fluid, is capable of providing a corrosion weight loss to a metal plate of less than 0.05 pounds per square feet (lb/ft$^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 lb/ft$^2$ under the testing conditions; and introducing the treatment fluid into the well.

According to another embodiment, a method of treating a portion of a well comprises: forming a treatment fluid, wherein the treatment fluid comprises: (A) water; (B) a carboxylate, wherein the carboxylate is capable of forming a carboxylic acid in the presence of the water; and (C) a corrosion inhibitor, wherein the corrosion inhibitor: (i) is a polymer, wherein the polymer comprises silicone, an ether monomer residue, and an amine functional group; and (ii) is capable of forming an ammonium salt in the presence of the carboxylic acid; and introducing the treatment fluid into the well.

According to another embodiment, a treatment fluid comprises: water; a carboxylate; and a corrosion inhibitor, wherein the corrosion inhibitor is a polymer, wherein the polymer comprises silicone, an ether monomer residue, and an amine functional group; wherein a test fluid consisting essentially of the water, the carboxylate, and the corrosion inhibitor, and in the same proportions as in the treatment fluid, is capable of providing a corrosion weight loss to a metal plate of less than 0.05 pounds per square feet (lb/ft$^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 lb/ft$^2$ under the testing conditions.

It is to be understood that the discussion of preferred embodiments regarding the treatment fluid or any ingredient in the treatment fluid, is intended to apply to the composition embodiments and the method embodiments. Any reference to the unit "gallons" means U.S. gallons.

The treatment fluid includes water. The treatment fluid can be a homogenous fluid or a heterogeneous fluid. The treatment fluid can be a colloid, such as a slurry, emulsion, or foam. If the treatment fluid is a colloid, then preferably the water is the liquid continuous phase of the colloid. The liquid continuous phase can include dissolved materials and/or undissolved solids. The water can be selected from the group consisting of freshwater, seawater, brine, and any combination thereof in any proportion. The treatment fluid can further include a water-soluble salt. Preferably, the salt is selected from sodium chloride, calcium chloride, calcium bromide, potassium chloride, potassium bromide, magnesium chloride, and any combination thereof. The treatment fluid can contain the water-soluble salt in a concentration in the range of about 5% to about 35% by weight of the water (bww).

The treatment fluids for any of the embodiments include a carboxylate. As used herein a "carboxylate" is a salt or ester of carboxylic acid. According to an embodiment, the carboxylate is a carboxylate salt. A salt is an ionic compound that is formed by replacing one or more of the hydrogen ions of an acid with a different cation. A carboxylate salt has the general formula M(RCOO)$_n$, where M is a metal, R can be hydrogen (H) or organic groups (e.g., methyl, ethyl, propyl, etc.), and n is a number (e.g., 1, 2, 3 . . . ). A carboxylate salt can also include a metal. According to another embodiment, the carboxylate is a carboxylate ester. A carboxylate ester is a compound in which the hydrogen atom of a carboxylic acid is replaced by a hydrocarbon group. A carboxylate ester has the general formula RCOOR' where R and R' are organic groups and R' is not a hydrogen atom. Examples of suitable esters include ethyl acetate, ethyl lactate, ethyl formate, isobutyl acetate, and isobutyl formate. Examples of suitable formate esters include, ethylene glycol monoformate, ethylene glycol diformate, diethylene glycol diformate, glyceryl monoformate, glyceryl diformate, glyceryl triformate, triethylene glycol diformate and formate esters of pentaerythritol, and are discussed in U.S. Pat. No. 6,877,563, issued to Bradley L. Todd and Eric Davidson on Apr. 12, 2005, which is hereby incorporated by reference in its entirety for all purposes. The carboxylate can be selected from the group consisting of formate, acetate, lactate, oxalate, and citrate.

According to an embodiment, the carboxylate is capable of forming a carboxylic acid in the presence of the water. The formation of the carboxylic acid can occur via hydrolysis of the carboxylate and water, wherein the carboxylate gains a hydrogen atom from the water to form carboxylic acid. A common kind of hydrolysis occurs when a salt of a weak acid or weak base (or both) is dissolved in water. Water spontaneously ionizes into hydroxyl anions and hydrogen cations. The salt, too, dissociates into its constituent anions and cations. For example, sodium acetate dissociates in water into sodium and acetate ions. The sodium ions react very little with the hydroxyl ions; whereas, the acetate ions combine with hydrogen ions to form acetic acid. The carboxylic acid can be, without limitation, formic acid, acetic acid, lactic acid, oxalic acid, or citric acid. The type of carboxylic acid formed will depend on the carboxylate selected. For example, if a formate is selected, then the carboxylic acid will be formic acid—if a citrate is selected, then the carboxylic acid will be citric acid, and so on.

The carboxylate can be part of a delayed acid breaker system. An example of a commercially-available delayed acid breaker system is N-FLOW™, marketed by Halliburton Energy Services, Inc. According to an embodiment, the formation of the carboxylic acid from the carboxylate and the water is delayed for a desirable amount of time. Preferably, the desired amount of time is at least the necessary time to introduce the treatment fluid into the well. According to another embodiment, the carboxylic acid is capable of dissolving at least a portion of a filtercake. By way of example, the treatment fluid can be introduced into a well, the carboxylate begins hydrolysis via a reaction with the water, the bottomhole temperature can act as a catalyst for the hydrolysis of the carboxylate, the carboxylic acid can then dissolve at least a portion of the filtercake. According to an embodiment, the carboxylate is in a sufficient concentration such that the hydrolyzed carboxylate is capable of dissolving at least a portion of the filtercake. According to another embodiment, the carboxylate is in a concentration of at least 5% by weight of water (bww) in the treatment fluid. The carboxylate can also be in a concentration in the range of about 5% to about 25%, preferably about 10% to about 20% by weight of the water in the treatment fluid.

The methods can further include the step of causing or allowing the formation of the carboxylic acid. The step of causing or allowing can include introducing heat into the bottomhole portion of the well. In this manner, the increase in temperature can function as a catalyst for the hydrolysis of the carboxylate.

The treatment fluid includes the corrosion inhibitor. The corrosion inhibitor is a polymer. The polymer can be a copolymer. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various ways along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility in water, its viscosity, and its biodegradability. For a copolymer, each of the monomers will be repeated a certain number of times (number of repeating units). The average molecular weight for a copolymer can be expressed as follows:

$$\text{Avg. molecular weight} = (M.W.m_1 * RUm_2) + (M.W.m_2 * RUm_2)$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on.

The polymer comprises silicone, an ether monomer residue, and an amine functional group. Preferably, the backbone of the polymer comprises the silicone. As used herein, the term "silicone" means a monomer residue that includes at least the elements silicon, carbon, hydrogen, and oxygen. The silicone can also include other elements. The backbone can also include the ether monomer residue. The ether monomer residue can also be a side chain of the polymer. The ether monomer residue can be part of a polyether group. The polymer can also comprise other monomer residues.

The polymer also includes an amine functional group. According to an embodiment, the polymer includes two or more amine functional groups. The amine functional group can be a primary, secondary, or tertiary amine. Moreover, each amine functional group can be the same or different. For example, a first amine can be a primary amine, a second amine can be a secondary amine, a third amine can be a tertiary amine, and so on. According to an embodiment, the amine functional group is capable of forming an ammonium salt in the presence of the carboxylic acid. The methods can further include the step of causing or allowing the formation of the ammonium salt.

The polymer can have a molecular weight such that the polymer is hydrophilic. The polymer can also have a molecular weight such that the polymer is water soluble. As used herein, the term "soluble" means that at least 1 part of the substance dissolves in 20 parts of the liquid at a temperature of 75° F. (24° C.) and a pressure of 1 atm (0.1 MPa). According to an embodiment, the polymer is biocompatible. As used herein, "biocompatible" means the quality of not having toxic or injurious effects on biological systems. For example, if the treatment fluid is used in off-shore drilling, then a release of the polymer into the water would not be harmful to aquatic life. According to another embodiment, the polymer is biodegradable. The molecular weight of the polymer can be selected such that the polymer is biocompatible and/or biodegradable.

According to an embodiment, a test fluid consisting essentially of the water, the carboxylate, and the corrosion inhibitor, and in the same proportions as in the treatment fluid, is capable of providing a corrosion weight loss to a metal plate of less than 0.05 pounds per square feet (lb/ft$^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 lb/ft$^2$ under the testing conditions. The metal or metal alloy of the plate can be selected based on the metal that is anticipated to be encountered in actual working conditions. For example, the metal of the metal plate can be steel, zinc, iron, 13Cr, SS304, SS316, N80, and P110.

According to another embodiment, the test fluid is also capable of providing a corrosion rate to the metal plate equal to or less than 50 mils per year (mpy) under testing conditions consisting of a temperature of 200° F. (93.3° C.), a pressure of 500 psi (3.4 MPa), and a time of 7 days, whereas a substantially identical test fluid without the corrosion inhibitor provides a corrosion rate of greater than 50 mpy under the testing conditions.

According to an embodiment, the corrosion inhibitor is in at least a sufficient concentration such that the test fluid provides a corrosion weight loss to the metal plate of less than 0.05 lb/ft$^2$, preferably less than 0.03 lb/ft$^2$, under the testing conditions. According to another embodiment, the corrosion inhibitor is in at least a sufficient concentration such that the test fluid provides a corrosion rate to the metal plate less than 50 mpy under the testing conditions. According to yet another embodiment, the number of amine functional groups of the polymer is at least sufficient such that the test fluid provides a corrosion weight loss to the metal plate of less than 0.05 lb/ft$^2$, preferably less than 0.03 lb/ft$^2$, under the testing conditions and/or a corrosion rate less than 50 mpy under the testing conditions. Preferably, the number of amine functional groups is selected such that a sufficient concentration of ammonium salt is formed such that the test fluid provides a corrosion weight loss to the metal plate of less than 0.05 lb/ft$^2$, preferably less than 0.03 lb/ft$^2$, under the testing conditions and/or a corrosion rate less than 50 mpy under the testing conditions. By way of example, the polymer can be formed such that a desired number of amine functional groups are present. The desired number of amine functional groups can be selected based on the concentration of the carboxylate and the anticipated concentration of the to be formed carboxylic acid.

The corrosion inhibitor can be in a concentration of at least 0.5% by volume of the water. The corrosion inhibitor can also be in a concentration in the range of about 0.5% to about 5% by volume of the water, preferably about 1% to about 4% by volume.

The treatment fluid can further include additional additives including, but not limited to, corrosion inhibitor intensifiers, pH buffers, viscosifiers, emulsifiers, weighting agents, fluid loss additives, friction reducers, surface wetting agents, surfactants, solvents, scale inhibitors, catalysts, clay stabilizers, gases, foaming agents, iron control agents, and solubilizers.

The treatment fluid can include a corrosion inhibitor intensifier. The corrosion inhibitor intensifier can comprise metal ions, halide ions, or certain organic compounds. Halide ions have proven to be an effective inhibitor intensifier in high-temperature environments, especially for hydrochloric acid-formic acid mixtures. Commercially-available examples of a corrosion inhibitor intensifier include HII-124B™, HII-124F™, and HII-124C™, marketed by Halliburton Energy Services, Inc. The corrosion inhibitor intensifier can be in a concentration in the range of about 30 to about 200 pounds per 1,000 gallons of the treatment fluid.

According to an embodiment, the treatment fluid provides a corrosion weight loss to the metal plate of less than 0.05 lb/ft$^2$, preferably less than 0.03 lb/ft$^2$ at a temperature of 200° F. (93.3° C.), a pressure of 500 psi (3.4 MPa), and a time of 24 hours. According to another embodiment, the treatment fluid provides a corrosion weight loss to a metal component of a wellbore of less than 0.05 lb/ft$^2$, preferably less than 0.03 lb/ft$^2$, at the bottomhole conditions of the well. As used herein, the term "bottomhole" means the location of the wellbore to be treated. According to an embodiment, the treatment fluid provides a corrosion rate to the metal plate of less than 50, preferably less than 40, more preferably less than 20 mpy at a temperature of 200° F. (93.3° C.), a pressure of 500 psi (3.4 MPa), and a time of 7 days. According to another embodiment, the treatment fluid provides a corrosion rate to a metal component of a wellbore of less than 50, preferably less than 40, more preferably less than 20 mpy at the bottomhole conditions of the well.

The treatment fluid can be, without limitation, a drilling fluid, spacer fluid, completion fluid, a work-over fluid, a stimulation fluid (e.g. a fracturing fluid or acidizing fluid), or a packer fluid.

The methods include the step of forming the treatment fluid. The treatment fluid can be formed ahead of use or on the fly. The methods include the step of introducing the treatment fluid into the well. The step of introducing can comprise pumping the treatment fluid into the well. The well can be, without limitation, an oil, gas, or water production well, or an injection well. According to an embodiment, the well penetrates a reservoir or is located adjacent to a reservoir. The methods can further include the step of removing at least a portion of the treatment fluid after the step of introducing. The methods can include the additional steps of perforating, fracturing, or performing an acidizing treatment, after the step of introducing.

EXAMPLES

To facilitate a better understanding of the present invention, the following examples of certain aspects of preferred embodiments are given. The following examples are not the only examples that could be given according to the present invention and are not intended to limit the scope of the invention.

Unless stated otherwise, all of the treatment fluids were mixed and tested according to the procedure for the specific test as described in The Detailed Description section above. The corrosion weight loss and corrosion rate tests were conducted on 1010 steel plates at a temperature of 150° F. (65.6° C.) or 200° F. (93.3° C.), a pressure of 500 psi (3.4 MPa), and a time of either 24 hours or 7 days. Each of the treatment fluids contained at least: deionized water; sodium chloride salt at a concentration of 9.2 pounds per gallon (ppg) of the water; and a formate ester-based delayed acid breaker system at a concentration of 10% by volume of the water. All other test fluids, except the blank, also contained varying concentrations of HII-124B™ corrosion inhibitor intensifier in units of pounds per 1,000 gallons (lb/1,000 gal) of the treatment fluid and varying concentrations of an amino-modified silicone-polyether copolymer (LK-HS 9500B from Elkay Chemicals, Pune, India) as the corrosion inhibitor in units of percent by volume of the water (% vl).

Table 1 contains corrosion inhibitor concentrations (% vl), corrosion inhibitor intensifier concentrations (lb/1,000 gal), initial weight of the metal plate in grams (g), final weight of the metal plate (g), weight loss (g), corrosion weight loss in pounds per square feet (lb/sq. ft.), and corrosion rate data in mils per year (mpy) for several treatment fluids at a time of 24 hours and a temperature of 200° F. (93.3° C.).

TABLE 1

| Test Fluid | Conc. of Corrosion Inhibitor | Corrosion Inhibitor Intensifier | Initial Weight (g) | Final Weight (g) | Weight Loss (g) | Corrosion Weight Loss (lb/sq. ft.) | Corrosion Rate (mpy) |
|---|---|---|---|---|---|---|---|
| Blank | 0 | 0 | 21.2367 | 18.2636 | 2.9744 | 0.1498 | 1338.69 |
| 1 | 1% | 0 | 21.3235 | 20.8152 | 0.5083 | 0.0257 | 229.45 |
| 2 | 1% | 120 | 21.4159 | 21.2917 | 0.1242 | 0.0063 | 56.06 |

As can be seen in Table 1, the blank fluid had a corrosion weight loss of 0.15 and a corrosion rate of over 1,000 mpy. The treatment fluids #1 and #2, containing the corrosion inhibitor LK-HS 9500B, had a corrosion weight loss of less than 0.05 lb/sq. ft. This indicates that the amino-modified silicone polyether polymer corrosion inhibitor functioned very effectively as a corrosion inhibitor. Moreover, as can be seen in Table 1, fluid #2 exhibited a much lower corrosion weight loss when a corrosion inhibitor intensifier was added to the treatment fluid compared to fluid #1 that did not contain the corrosion inhibitor intensifier. This indicates that the addition of a corrosion inhibitor intensifier can increase the effectiveness of the corrosion inhibitor. Furthermore, fluids #1 and #2 both exhibited much lower corrosion rates compared to the blank.

Table 2 contains corrosion inhibitor concentration in units of percent by volume of the water (% vl), temperature of either 150° F. (65.6° C.) or 200° F. (93.3° C.), corrosion inhibitor intensifier concentrations (lb/1,000 gal), initial weight of the metal plate (g), final weight of the metal plate (g), weight loss (g), corrosion weight loss (lb/sq. ft.), and corrosion rate data (mpy) for several treatment fluids at a time of 7 days.

indicates that the presence of a corrosion inhibitor intensifier can greatly improve the effectiveness of the corrosion inhibitor. As can also be seen, for treatment fluids #2 and #3 containing the same concentrations of the corrosion inhibitor and the corrosion inhibitor intensifier, treatment fluid #3 tested at 200° F. (93.3° C.) exhibited a higher corrosion weight loss and corrosion rate. This seems to indicate that the effectiveness of the corrosion inhibitor may be dependent on temperature. The concentration of the corrosion inhibitor and also possibly the corrosion inhibitor intensifier may need to be adjusted depending on the anticipated bottomhole temperature.

Table 3 illustrates fluids that simulate wellbores containing a filtercake. The metal plates were tested by preparing the test fluids as follows: deionized water; sodium chloride salt at a concentration of 9.2 pounds per gallon (ppg) of the water; and a formate ester-based delayed acid breaker system at a concentration of 10% by volume of the water were added to a mixing container and the delayed acid was allowed to hydrolyze in the salt water for 16 hours. The following ingredients were then added to the test fluids: BARACARB® containing calcium carbonate to simulate a filtercake at a concentration of 20 grams (g); HII-124B™ corrosion inhibitor intensifier at a concentration of 120 pounds per 1,000 gallons (lb/1,000 gal) of the treatment fluid; and an amino-modified siliconepolyether copolymer (LK-HS 9500B from Elkay Chemicals,

TABLE 2

| Test Fluid | Temp. (° F.) | Conc. of Corrosion Inhibitor | Conc. of Corrosion Inhibitor Intensifier | Initial Weight (g) | Final Weight (g) | Weight Loss (g) | Corrosion Weight Loss (lb/sq. ft.) | Corrosion Rate (mpy) |
|---|---|---|---|---|---|---|---|---|
| Blank | 200 | 0 | 0 | 21.0170 | 12.8487 | 8.1683 | 0.4126 | 526.74 |
| 1 | 150 | 1% | 0 | 21.0141 | 20.2452 | 0.7689 | 0.0388 | 49.58 |
| 2 | 150 | 1% | 120 | 21.0727 | 20.9420 | 0.1307 | 0.0063 | 8.43 |
| 3 | 200 | 1% | 120 | 21.0010 | 20.4910 | 0.5100 | 0.0258 | 32.89 |

As can be seen in Table 2, all of the treatment fluids #1-#3 had a corrosion weight loss of less than 0.05 lb/sq. ft., which was much less than the blank fluid. At a temperature of 150° F. (65.6° C.), treatment fluid #2, also containing the corrosion inhibitor intensifier, had a lower corrosion weight loss and also a much lower corrosion rate compared to fluid #1. This Pune, India) as the corrosion inhibitor at a concentration of 1% by volume of the water (% vl). Table 3 contains temperature in ° F., final pH, initial weight of the metal plate (g), final weight of the metal plate (g), weight loss (g), corrosion weight loss (lb/sq. ft.), and corrosion rate data (mpy) for the treatment fluids at a time of 7 days.

TABLE 3

| Test Fluid | Temp. (° F.) | Final pH | Initial Weight (g) | Final Weight (g) | Weight Loss (g) | Corrosion Weight Loss (lb/sq. ft.) | Corrosion Rate (mpy) |
|---|---|---|---|---|---|---|---|
| 1 | 150 | 4.54 | 21.4954 | 21.1694 | 0.3260 | 0.0164 | 21.02 |
| 2 | 200 | 5.37 | 21.3939 | 20.6551 | 0.7388 | 0.0373 | 47.64 |

As can be seen in Table 3, the treatment fluids had a corrosion weight loss of less than 0.05 lb/sq. ft. Fluid #1 had a lower corrosion rate compared to fluids #2, which indicates that temperature may have an effect on the performance of the corrosion inhibitor. Moreover, the data in Table 3 indicates that when actual wellbore conditions are simulated, the delayed acid breaker system functions effectively and the corrosion inhibitor also functions effectively.

Figure 2:
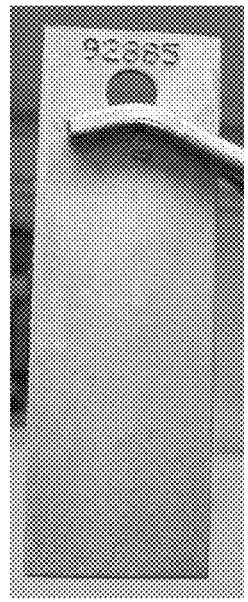
FIG. 2 is a photograph of a metal plate tested for corrosion weight loss and corrosion rate when contacted with a test fluid containing a corrosion inhibitor and a corrosion inhibitor intensifier at a temperature of 200° F. (93.3° C.) for a time of 7 days.

FIG. 1 is a photograph of the metal plate for the blank fluid of Table 2. FIG. 2 is a photograph of the metal plate for the treatment fluid #3 of Table 2. As can be seen in FIG. 1, the blank fluid that did not contain a corrosion inhibitor caused significant corrosion of the metal plate. However, as can be seen in FIG. 2, the fluid containing the corrosion inhibitor and a corrosion inhibitor intensifier caused little to no corrosion of the metal plate. These figures further support the effectiveness of the corrosion inhibitor.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a well comprising:
   forming a treatment fluid, wherein the treatment fluid comprises:
   (A) water;
   (B) a carboxylate; and
   (C) a corrosion inhibitor, wherein the corrosion inhibitor is a polymer, wherein the polymer comprises silicone, an ether monomer residue, and an amine functional group, and
   wherein the backbone of the polymer comprises the silicone and the ether monomer residue;
   wherein a test fluid consisting essentially of the water, the carboxylate, and the corrosion inhibitor, and in the same proportions as in the treatment fluid, is capable of providing a corrosion weight loss to a metal plate of less than 0.05 pounds per square feet (lb/ft$^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 lb/ft$^2$ under the testing conditions; and
   introducing the treatment fluid into the well.

2. The method according to claim 1, wherein the water is selected from the group consisting of freshwater, seawater, brine, and any combination thereof in any proportion.

3. The method according to claim 1, wherein the carboxylate is a carboxylate salt.

4. The method according to claim 1, wherein the carboxylate is a carboxylate ester.

5. The method according to claim 1, wherein the carboxylate is part of a delayed acid breaker system.

6. The method according to claim 1, wherein the carboxylate is capable of forming a carboxylic acid in the presence of the water.

7. The method according to claim 6, wherein the formation of the carboxylic acid occurs via hydrolysis of the carboxylate and water.

8. The method according to claim 6, wherein the formation of the carboxylic acid is delayed for a desirable amount of time.

9. The method according to claim 8, wherein the desired amount of time is at least the necessary time to introduce the treatment fluid into the well.

10. The method according to claim 6, wherein the carboxylic acid is capable of dissolving at least a portion of a filtercake.

11. The method according to claim 10, wherein the carboxylate is in a sufficient concentration such that the hydrolyzed carboxylate is capable of dissolving at least a portion of the filtercake.

12. The method according to claim 1, wherein the carboxylate is in a concentration in the range of about 5% to about 25% by weight of the water in the treatment fluid.

13. The method according to claim 1, wherein the amine functional group is a primary, secondary, or tertiary amine.

14. The method according to claim 6, wherein the amine functional group is capable of forming an ammonium salt in the presence of the carboxylic acid.

15. The method according to claim 1, wherein the corrosion inhibitor is in at least a sufficient concentration such that the test fluid provides a corrosion weight loss to the metal plate of less than 0.05 lb/ft$^2$ under the testing conditions.

16. The method according to claim 1, wherein the number of amine functional groups of the polymer is at least a sufficient number such that the test fluid provides a corrosion weight loss to the metal plate of less than 0.05 lb/ft$^2$ under the testing conditions.

17. The method according to claim 1, wherein the corrosion inhibitor is in a concentration in the range of about 0.5% to about 5% by volume of the water.

18. The method according to claim 1, wherein the treatment fluid further comprises a corrosion inhibitor intensifier.

19. The method according to claim 1, wherein the treatment fluid is a drilling fluid, spacer fluid, completion fluid, a work-over fluid, a stimulation fluid (e.g. a fracturing fluid or acidizing fluid), or a packer fluid.

20. A method of treating a portion of a well comprising:
forming a treatment fluid, wherein the treatment fluid comprises:
(A) water;
(B) a carboxylate; and
(C) a corrosion inhibitor, wherein the corrosion inhibitor is a polymer, wherein the polymer comprises silicone, an ether monomer residue, and an amine functional group, and
wherein the backbone of the polymer comprises the ether monomer residue;
wherein a test fluid consisting essentially of the water, the carboxylate, and the corrosion inhibitor, and in the same proportions as in the treatment fluid, is capable of providing a corrosion weight loss to a metal plate of less than 0.05 pounds per square feet ($lb/ft^2$) under testing conditions of 200° F. (93.3° C.), a pressure of 500 psi (3.4 MPa), and a time of 24 hours whereas a substantially identical test fluid without the corrosion inhibitor provides a corrosion weight loss of greater than 0.05 $lb/ft^2$ under the testing conditions; and
introducing the treatment fluid into the well.

21. The method according to claim 20, wherein the carboxylate is part of a delayed acid breaker system.

22. The method according to claim 20, wherein the carboxylate is capable of forming a carboxylic acid in the presence of the water.

23. The method according to claim 20, wherein the amine functional group is a primary, secondary, or tertiary amine.

24. The method according to claim 20, wherein the amine functional group is capable of forming an ammonium salt in the presence of the carboxylic acid.

* * * * *